US009466320B1

United States Patent
Staffaroni et al.

(10) Patent No.: US 9,466,320 B1
(45) Date of Patent: Oct. 11, 2016

(54) THERMAL ASSISTED MAGNETIC RECORDING LIGHT DELIVERY WAVEGUIDE CIRCUIT FOR REDUCED STRAY LIGHT INDUCED WRITER PROTRUSION

(71) Applicant: Headway Technologies, Inc., Milpitas, CA (US)

(72) Inventors: Matteo Staffaroni, San Ramon, CA (US); Xuhui Jin, San Jose, CA (US); Weihao Xu, San Jose, CA (US); Luc Chung, Fremont, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 14/918,627

(22) Filed: Oct. 21, 2015

(51) Int. Cl.
| | |
|---|---|
| G11B 5/127 | (2006.01) |
| G11B 11/00 | (2006.01) |
| G11B 5/02 | (2006.01) |
| G11B 5/48 | (2006.01) |
| G11B 5/60 | (2006.01) |
| G11B 5/31 | (2006.01) |
| G11B 5/00 | (2006.01) |

(52) U.S. Cl.
CPC .............. *G11B 5/4866* (2013.01); *G11B 5/314* (2013.01); *G11B 5/6082* (2013.01); *G11B 2005/0021* (2013.01)

(58) Field of Classification Search
CPC ... G11B 5/4866; G11B 5/6082; G11B 5/314; G11B 5/0021; G11B 11/10534; G11B 11/1058; G11B 2005/0002; G11B 5/3903; B82Y 10/00; B82Y 11/10543
USPC ....... 369/13.33, 13.13, 13.32, 13.17; 360/59, 360/313; 29/603.01; 250/203.2
See application file for complete search history.

(56) References Cited

U.S. PATENT DOCUMENTS

| | | | |
|---|---|---|---|
| 7,898,759 B2 | 3/2011 | Matsumoto et al. | |
| 7,944,647 B2 | 5/2011 | Dugas et al. | |
| 8,054,571 B2 | 11/2011 | Matsumoto et al. | |
| 8,248,898 B2 * | 8/2012 | Schreck ................ | G11B 5/314 369/13.13 |
| 8,488,419 B1 | 7/2013 | Jin et al. | |
| 8,670,294 B1 | 3/2014 | Shi et al. | |
| 8,842,506 B1 | 9/2014 | Matsumoto et al. | |
| 8,908,481 B1 | 12/2014 | Miyamoto | |
| 9,001,628 B1 | 4/2015 | Shi et al. | |
| 2014/0098652 A1 | 4/2014 | Tomiyama et al. | |
| 2015/0131415 A1 | 5/2015 | Peng | |

OTHER PUBLICATIONS

Co-pending U.S. Appl. No. 14/880,385, filed Oct. 12, 2015, "Thermal Assisted Magnetic Recording Spot-Size Converter With Finite Ridge Width," by Matteo Staffaroni et al., 46 pgs.

\* cited by examiner

*Primary Examiner* — Nabil Hindi
(74) *Attorney, Agent, or Firm* — Saile Ackerman LLC; Stephen B. Ackerman

(57) ABSTRACT

A thermally assisted magnetic recording head is disclosed with a light delivery waveguide circuit wherein a middle section of the primary waveguide (WG) has a curved portion. In one embodiment, the curved portion connects to a front WG section at the air bearing surface (ABS) and is offset in a cross-track direction from the laser diode to prevent stray light from heating metal parts proximate to the front section and undesirable writer protrusion. Optionally, a reflective blocker is inserted between the WG spot size converter and ABS. In a second embodiment, the laser diode, spot size converter, and front WG section are all aligned along a center slider plane. The curved portion has at least one 180° bend to bend light around the blocker that is between the spot size converter and WG front section. The blocker is tilted to prevent reflected light from returning to the laser diode.

28 Claims, 8 Drawing Sheets

THERMAL ASSISTED MAGNETIC RECORDING LIGHT DELIVERY WAVEGUIDE CIRCUIT FOR REDUCED STRAY LIGHT INDUCED WRITER PROTRUSION

RELATED PATENT APPLICATIONS

This application is related to the following: U.S. patent application Ser. No. 14/880,385, filing date 10/12/15; and U.S. Pat. No. 8,488,419, which are assigned to a common assignee; and herein incorporated by reference in their entirety.

TECHNICAL FIELD

The present disclosure relates to magnetic read/write heads based on thermally assisted magnetic recording (TAMR), and in particular to a waveguide structure wherein a front section of a primary waveguide proximate to an air bearing surface (ABS) is offset from a back section including a spot size converter that is adjacent to a laser diode source in order to prevent stray light from heating metal structures in the write head and unwanted writer protrusion.

BACKGROUND

TAMR is expected to be one of the future generations of magnetic recording technologies that will enable recording at ~1-10 Tb/in$^2$ data densities. TAMR involves raising the temperature of a small region of the magnetic medium to near its Curie temperature where both of its coercivity and anisotropy are significantly reduced and magnetic writing becomes easier to achieve even with weak write fields characteristic of small write heads in high recording density schemes. In TAMR, optical power from a laser diode is converted into localized heating in a recording medium during a write process to temporarily reduce the field needed to switch the magnetizations of the medium grains. Thus, with a sharp temperature gradient of TAMR acting alone or in alignment with a high magnetic field gradient, data storage density can be further improved with respect to current state of the art recording technology.

In addition to the components of conventional write heads, a TAMR head includes an optical waveguide (WG), and a plasmon generator (PG) that is also referred to as a near-field transducer. The waveguide serves as an intermediate path to guide light (from a laser diode mounted on the back of a slider) to the PG where the waveguide optical mode couples to the propagating plasmon mode of the PG. After the optical energy is transformed to plasmon energy with energy transmission along the PG, it is concentrated at the medium location where heating is desired. Ideally, the heating spot is correctly aligned with the magnetic field from the write head to realize optimum TAMR performance.

Due to an inherent mode profile mismatch between the laser diode's far-field and the waveguide mode required to excite the near-field transducer, the waveguide's cross-sectional dimensions are commonly varied along the length of the slider so as to improve the coupling efficiency. The portion of the optical waveguide (WG) where the cross-sectional dimension changes along the light's propagation direction is typically called the spot-size converter. The spot-size converter usually includes multiple WG layers stacked on top of each other so that the total stack thickness is on the order of the laser diode spot size (around 1 micron). To achieve lateral confinement of light, the WG layers are tapered in the cross-track direction. For vertical confinement of light, all of the WG layers except the primary waveguide that eventually terminates at the ABS, may be tapered in the cross-track direction to a tip that is recessed from the ABS, and with a small cross-track dimension to force the propagating light mode into the primary WG.

Even with confinement of light by using a spot size converter, a substantial amount of light from the laser diode will not be coupled into the waveguide but will instead travel the length of the slider in weakly confined cladding modes. The unconfined stray light is absorbed by any metal elements such as write pole structures in its path thereby causing thermo-mechanical expansion of the metal structures to produce undesired broad area writer protrusion. This stray light issue is associated with designs where the laser diode is butt coupled (i.e. end-fire coupled) into a spot-size converter waveguide. Part-to-part differences in laser diode to waveguide mounting alignment result in significant part-to-part variability in the amount of stray light and broad area writer protrusion that is induced. Accordingly, writer protrusion becomes an uncontrolled parameter.

Since spot size converters are commonly used in the industry, there is a need for an improved light delivery circuit for TAMR layouts where a laser diode is end-fire coupled into a spot size converter waveguide so that stray light does not lead to writer protrusion. The new design should minimize wear on protruded parts, and improve adhesion between adjoining layers by preventing undesirable stress on write head components. Thus, it is desirable to substantially reduce writer protrusion induced by stray light in order to improve reliability.

SUMMARY

One objective of the present disclosure is to provide an improved TAMR light delivery waveguide circuit that prevents stray light from an end-fired coupled laser diode from causing thermo-mechanical expansion of metal elements such as the write pole that leads to unwanted writer protrusion and write head stress.

A second objective of the present disclosure is to provide a TAMR light delivery circuit according to the first objective that retains a good waveguide mode for optimal light coupling to the near field transducer, and maintains high light transmission efficiency.

These objectives are realized in embodiments of the present disclosure wherein a TAMR write head structure includes a write pole, and a plasmon generator (PG) formed proximate to a leading edge of the write pole at the ABS. There is also an optical waveguide (WG) with a top surface that faces the PG such that the PG is between the WG and write pole in a down-track direction. The waveguide structure includes a primary waveguide and one or more secondary waveguides that capture light from a laser diode attached to a sub-mount on the back end of a slider. As the light propagates toward the ABS, the spot size converter section is tapered and laterally confines light in the cross-track direction. Light is also confined in the down-track direction by terminating the one or more secondary waveguides before reaching the ABS such that only the primary waveguide having a fixed thickness extends to the ABS. A portion of the light energy from a front section of the primary waveguide is transferred to the plasmon mode along the PG by evanescent coupling and is then propagated to the ABS and is near field coupled into a magnetic medium for spot heating during a write process.

A key feature of the present disclosure according to some embodiments is that the back portion of the waveguide structure including the spot size converter is offset in a cross-track direction from the front section of the primary waveguide at the ABS. In particular, the back portion of the waveguide structure has a first rectangular section at the back end of the slider where a first end faces the laser diode, a second end having a cross-track width w1 faces the ABS and is parallel thereto, and two sides connecting the first and second ends where the two sides are formed perpendicular to the back end of the slider. A second waveguide section comprises the spot-size converter and has two tapered sides in a primary WG each extending from a second end of the first rectangular portion at a first plane to a second plane formed parallel to the ABS. The spot size converter has a cross-track width w2 at the second plane where w2<w1. The second waveguide section may also include a second rectangular portion having width w2 and extending a distance d2 from the second plane to a third plane formed parallel to the ABS. The first and second waveguide sections are offset a distance w3 from a center plane formed perpendicular to the ABS and that intersects the PG. Optionally, the first rectangular section is omitted and the back side of the waveguide structure is formed at the first plane.

There is a third waveguide section consisting of the primary waveguide. According to one embodiment, the third WG section has a first bend where a first end thereof connects to a front side of the second WG section at the third plane, and a second end is connected to a straight portion of primary WG formed parallel to the ABS. At the opposite end of the straight portion, there is a second bend that connects to a fourth waveguide section having a rectangular shape and a lengthwise dimension d1 along the center plane. The fourth WG section is aligned perpendicular to the ABS and terminates at the ABS. The fourth WG section is responsible for evanescent coupling to the PG and has a cross-track width w2. Preferably, the cross-track offset (w3) of the spot size converter and second WG section from the center plane is from 20 to 200 microns, and w2 is in the range of 400 nm to 800 nm.

The third waveguide section in the previous embodiment is fabricated such that each of the two bends is formed at an angle $\alpha$ between 30 and 90 degrees with respect to the center plane, or to a plane that is orthogonal to the ABS and bisects the spot size converter in a lengthwise direction. Each of the two bends has a bending radius of at least 10 to 20 microns to avoid sharp turns and prevent a significant loss of light from the waveguide path.

In another embodiment, a metal blocker made of Au or Cu, for example, or a laminated stack of dielectric materials may be inserted between a front end of the second WG section and the ABS in order to block any stray light from the laser diode that is not coupled into the waveguide structure. The metal blocker preferably is formed between the second plane and third plane, has a lengthwise dimension substantially in a cross-track direction, and is not parallel to the second plane such that reflected light is not directed back to the laser diode thereby avoiding an optical feedback induced laser diode instability issue.

In another embodiment, the metal blocker is inserted between a front side of the spot size converter and the fourth (front) section of the primary WG at the ABS. However, the back portion of the waveguide structure including the spot size converter is now formed along the same center plane as the front waveguide section at the ABS. In addition, the third waveguide section has a 180 degree bend that is a half circle shape to allow space for the metal blocker to be intersected by the center plane.

The present disclosure also anticipates that the aforementioned embodiment may be modified to include a second 180° bend around a writer back gap that is positioned between the metal blocker and the ABS at the center plane.

The present disclosure is also a method of fabricating a waveguide structure as defined herein.

DETAILED DESCRIPTION

The present disclosure is a TAMR light delivery waveguide circuit that minimizes unwanted writer protrusion caused by stray light emanating from a laser diode that induces thermo-mechanical expansion of metal parts proximate to the ABS. In all embodiments, the waveguide structure is comprised of a primary waveguide having a back section including a spot size converter, and a front section at the ABS. In some embodiments, the spot size converter and laser diode are offset in a cross-track direction from the front section that is formed along a center plane on a slider. In other embodiments, the spot size converter, laser diode, and front section are all formed along the center plane, and a middle waveguide section includes at least one 180° bend to provide space for a metal blocker to reflect stray light. In all drawings, the y-axis is the cross-track direction, the z-axis is the down-track direction, and the x-axis extends towards a back end of the slider on which the TAMR head including the waveguide structure is formed. The drawings are not necessarily drawn to scale. In particular, the cross-track dimension of the waveguide structure may be enlarged relative to the lengthwise dimension in order to clearly depict the light bending portions in the middle waveguide section, and tapered sides of the spot size converter. The terms plasmon generator (PG) and near field transducer may be used interchangeably.

Figure 1:
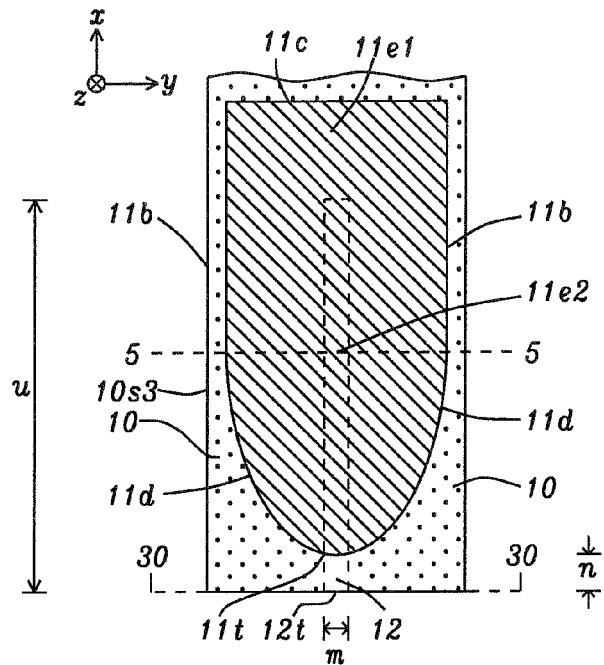
FIG. 1 is a top-down view of a plasmon generator (PG) structure formed on a waveguide according to a process of record employed by the inventors.

Referring to FIG. 1, a top-down view is shown of a portion of a TAMR head with a waveguide and plasmon generator (PG) that was previously disclosed by the inventors in related U.S. Pat. No. 8,488,419 wherein the PG is comprised of a metal peg 12 and an overlying metal layer 11 bounded by front tip 11$t$, sides 11$b$, 11$d$, and back end 11$c$. Peg 12 is one of Au, Cu, Ru, Cr, Pd, Pt, Ti, W, Ta, Fe, Co, Ni, or alloys thereof to provide low atom mobility, good thermal robustness and mechanical hardness, and superior resistance to corrosion. Metal layer 11 is comprised of Au, Cu, Ag, or alloys thereof for excellent optical efficiency. As a result, the PG has improved performance and durability over earlier PG structures. According to one embodiment of the present disclosure, the aforementioned PG design is implemented in a TAMR head with a waveguide structure described herein. However, it should be understood that other PG structures are compatible with the TAMR light delivery waveguide circuit disclosed herein.

With regard to the top-down view in FIG. 1 where overlying layers including the write pole have been removed, metal peg 12 has a rod-like appearance with a rectangular shape having a width m in a cross-track direction along the y-axis, a lengthwise dimension u of up to 2 microns along the x-axis, and a front end (tip) 12$t$ at the ABS 30-30. Although the waveguide is shown having a greater width in the cross-track direction than a back end 11$c$ of second metal layer, the second metal layer 11 may have a larger cross-track width than that of waveguide 10 in other embodiments. Note that the waveguide with sides 10$s$3 extends to a back end of the slider (not shown) on which the TAMR head is formed. A portion of second metal layer top surface 11$e$2 is formed above the metal peg 12, but the bulk of the top surface 11$e$1 is not above the first metal layer. Two sides 11$b$ of the second metal layer extend from the back end toward the ABS at essentially 90 degree angles and each side 11$b$ connects with a curved side 11$d$ that terminates in a front end 11$t$ above the metal peg. The front end is substantially narrower than the back end in order to concentrate plasmon energy on the metal peg. The front end is recessed from the ABS by a distance n of 5 to 150 nm. A back end PG section has a rectangular shape and is bounded by sides 11$b$ and formed between plane 5-5 and the back end 11$c$.

Figure 2:
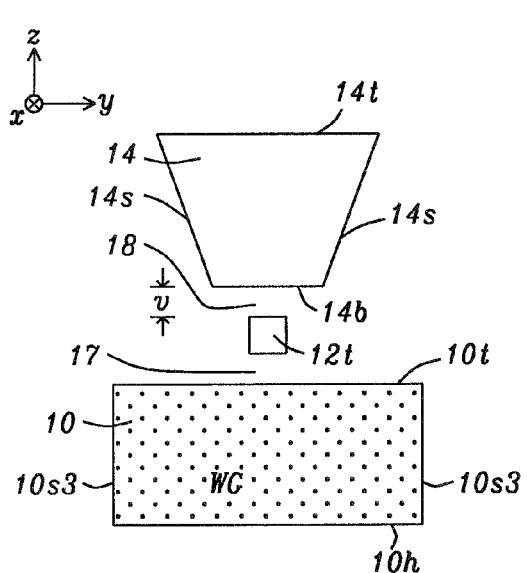
FIG. 2 is an ABS view of a TAMR structure with the PG and waveguide in FIG. 1, and a write pole according to a design currently practiced by the inventors.

Referring to FIG. 2, an ABS view is shown of the PG and waveguide structure in FIG. 1. Metal peg tip 12$t$ is formed between a top surface 10$t$ of the waveguide and a leading edge 14$b$ of write pole 14, and typically has a width less than a cross-track width of the leading edge. The metal peg tip is not limited to a square shape but may have another polygonal shape such as a trapezoid. Top and bottom surfaces of the metal peg are formed parallel to the waveguide top surface. In one aspect, the write pole has a trapezoidal shape at the ABS with the leading edge having a smaller cross-track width than that of the trailing edge 14$t$. Sidewalls 14$s$ connect top and bottom sides of the write pole. The trailing edge is part of the write pole trailing side. The TAMR head including PG tip 12$t$, waveguide 10, and write pole 14 move in a down-track direction over a magnetic medium (not shown) during a write process. Tip 12$t$ is separated from the write pole by a dielectric gap 18 with thickness v, and is separated from waveguide top surface 10$t$ by dielectric gap 17. As the down-track thickness of tip 12$t$ is decreased, the gap distance v is preferably reduced to maintain a good alignment of the magnetic field from the write pole and optical spot from the metal peg on the magnetic medium.

Figure 3:
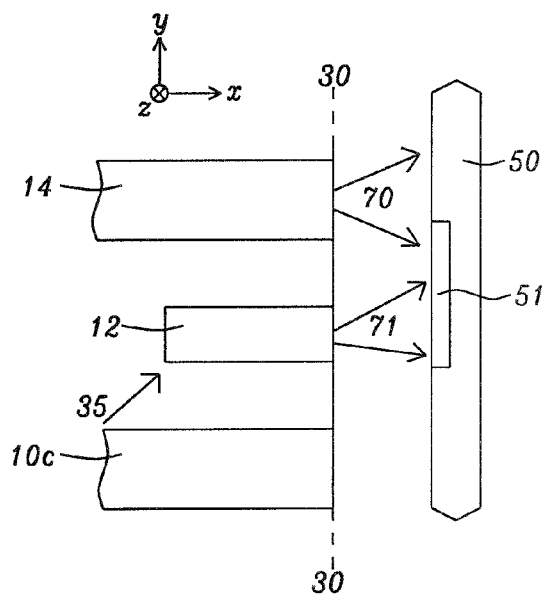
FIG. 3 is a down-track cross-sectional view showing a PG formed between a primary WG and a write pole at the ABS where the TAMR heating spot overlaps with a magnetic field on a magnetic medium in a TAMR scheme.

Referring to FIG. 3, a down-track cross-sectional view is shown of a portion of the TAMR write head in FIG. 2. Propagated light 35 from the primary waveguide 10 is coupled to the plasmon generator 12. The resulting plasmon energy 40 is evanescently coupled into a magnetic medium 50. Ideally, there is significant overlap of the resulting heating spot from the plasmon energy with the magnetic field 70 emanating from the write pole 14 in order to lower the magnitude of the magnetic field required to write a bit 51.

In related U.S. patent application Ser. No. 14/880,385, we disclosed a spot size converter in a waveguide structure where a front end of the one or more secondary waveguides terminates in a ridge with a finite cross-track width. Unlike the prior art where secondary waveguides typically terminate in a sharp tip, the ridge is reliably manufactured in a width of 50-170 nm and maintains high efficiency coupling of 90% or more into the primary WG even with overlay misalignment in the cross-track or lengthwise dimension of the primary WG on the secondary WG.

Here we disclose additional improvements in a TAMR light delivery waveguide circuit that may incorporate the spot size converter design in the related patent application. However, the waveguide structure disclosed herein is not limited to a specific spot size converter and anticipates the use of other spot size converter designs to offer improved TAMR performance. In all embodiments, propagated light in the one or more secondary waveguides is coupled into the primary waveguide. Thereafter, light in the primary WG is evanescently coupled to the PG where plasmon energy is transmitted to the ABS and evanescently coupled to a magnetic medium to generate a heating spot and thereby assist the write process.

Figure 4:
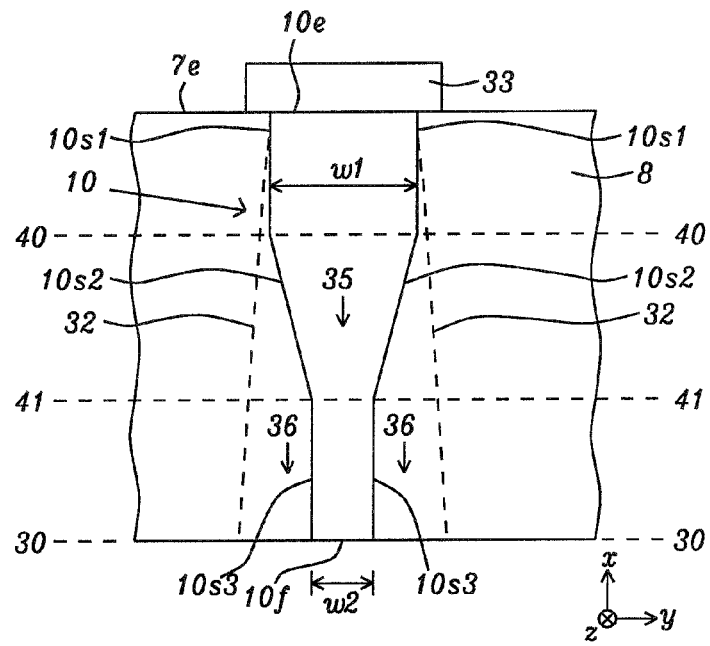
FIG. 4 is a top-down view of the primary waveguide portion of a spot size converter according to a design currently fabricated by the inventors.

Referring to FIG. 4, a top down view of a primary waveguide 10 currently fabricated by the inventors according to a process of record (POR) is illustrated. A laser diode 33 is end-fire couple mounted at the back end 7$e$ of a slider. The primary WG is formed within a substrate 8 that is a dielectric (cladding) layer, and typically has a core made of $Ta_2O_5$, $HfO_2$, Si, or the like with a high refractive index (RI). The cladding layer is comprised of a dielectric material such as alumina or silicon oxide. It is important that the refractive index (RI) of the cladding material is less than the RI of the core in order to maintain guided (i.e. confined) light transmission through the core and facilitate efficient light propagation toward the ABS and to the near field transducer. Primary WG 10 has a back section having a cross-track width w1 and bounded by sides 10$s$1, back side 10$e$, and a front side along plane 40-40. There is a spot size converter between plane 40-40 and plane 41-41 where tapered sides 10$s$2 laterally confine light 35 propagated toward the ABS 30-30. The spot size converter may include a secondary waveguide (not shown) that contacts a bottom surface of WG 10, and with a back end of width w1 at back side 7$e$, and terminating at a front end proximate to plane 41-41. A front section of the primary WG is rectangular shaped with a cross track width w2, which is preferably 400 to 800 nm, between sides 10s3 where w2<w1. The front section extends from plane 41-41 to the ABS and terminates at front side 10f.

One issue with the POR design is stray light 36 that is not coupled into the waveguide structure propagates to the ABS 30-30 in a region between dashed lines 32 as well as above and below the waveguide structure between plane 41-41 and the ABS. As a result, metal structures in the path of light 36 such as write pole 14 shown in FIG. 1 are heated and expand toward the medium. Excess heating of metal parts in the write head will produce internal stress, and cause the writer to protrude farther toward the medium than intended thereby leading to extra wear.

A laser diode 33 emitting light with a transverse-magnetic (TM) mode is preferably selected to provide light with a wavelength around 800 nm. The width w1 of the waveguide structure at back end 10e is dictated by the size of the light spot emanating from the laser diode whose emitting facet faces the back of the slider. Likewise, a total thickness of the waveguide structure including primary waveguide 10 and one or more secondary waveguides is chosen to be on the order of the laser spot size (approximately 1 micron or 1000 nm) in the down-track dimension. Light 35 from WG 10 is coupled to a PG (not shown) that is formed above the top surface of WG 10 and between plane 41-41 and the ABS.

According to various embodiment of the present disclosure, unwanted heating of metal structures proximate to the ABS by stray light from the laser diode in a TAMR light delivery waveguide circuit is prevented by introducing an offset of the back section of the waveguide structure from the front section at the ABS. In other words, the front section terminating at the ABS is maintained along a center plane of the slider. However, the laser diode and remainder of the waveguide including the spot size converter are offset in a cross-track direction from the center plane.

Figure 5:
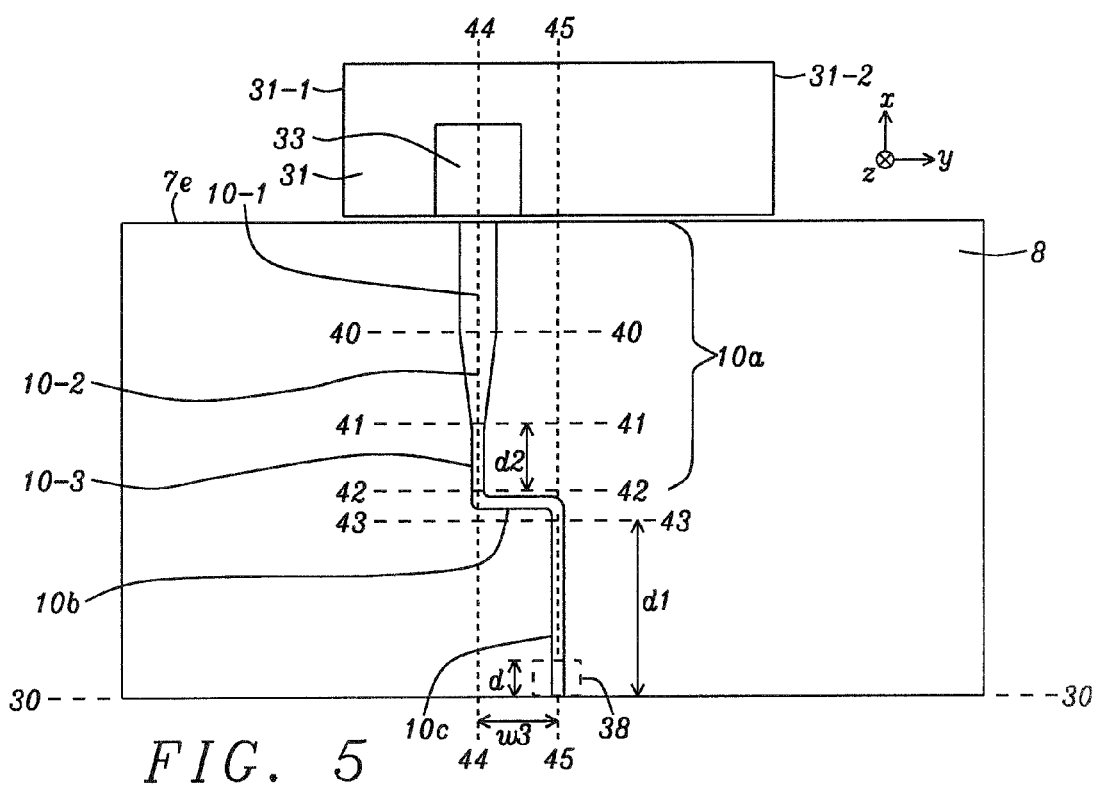
FIG. 5 is top-down view of TAMR light delivery waveguide circuit with a front section that is offset in a cross-track direction from a back section formed adjacent to a laser diode according to a first embodiment of the present disclosure.

Referring to the first embodiment depicted in FIG. 5, the primary waveguide has three sections 10a, 10b, and 10c wherein the back section 10a comprises a rectangular shaped sub-section (portion) 10-1 aligned along a plane 44-44 that is parallel to center plane 45-45, and which intersects the laser diode 33 mounted on a sub-mount 31. The back section also includes the spot size converter 10-2 having tapered sides between plane 40-40 and plane 41-41 as described previously. A back side of the spot size converter adjoins an ABS facing side of portion 10-1 at plane 40-40. In some embodiments, portion 10-1 may be omitted such that the laser diode 33 adjoins a back end of the slider at plane 40-40. The spot size converter narrows the cross-track width of the primary WG from w1 at plane 40-40 to w2 at plane 41-41. Moreover, the back section may include a third portion 10-3 having a fixed width w2 and a length d2 between plane 41-41 and plane 42-42 wherein both of the aforementioned planes are parallel to the ABS and located between plane 40-40 and the ABS. The third portion 10-3 (when present) and spot size converter are bisected in a lengthwise dimension by plane 44-44 and propagate light toward the ABS. Note that laser diode 33 is not centered on sub-mount 31 but is positioned closer to side 31s1 than to side 31s2. Preferably, slider 8 and laser diode sub-mount 31 are centered about center plane 45.

A key feature of the present disclosure is insertion of a curved section also referred to as middle section 10b wherein a back end thereof adjoins section 10a at plane 42-42, and a front end adjoins a third section 10c at plane 43-43. The front end is also intersected by center plane 45-45 at plane 43-43. In the exemplary embodiment, the curved section also includes a straight portion that may be aligned parallel to the ABS and formed between the front and back ends of section 10b. In an alternative embodiment described in more detail later, the straight portion may be aligned at an angle between 30° and 90° with respect to plane 44-44. As a result, the back end is offset a distance w3 of about 20 to 200 microns from the front end of the curved section. Front section 10c is rectangular shaped with sides 10s4 separated by distance w2 and with a front side 10f at the ABS. The front section is bisected in a lengthwise direction (orthogonal to the ABS) by center plane 45-45, and is responsible for evanescent coupling of light energy to the PG 38, which is also intersected by the center plane. The PG is shown with dashed lines since it is formed above a plane that includes the top surface of the waveguide light delivery circuit. In some embodiments, plane 43-43 is a height d1 of 10 to 15 microns from the ABS. The PG normally extends a height d of about 1 micron from the ABS.

Figure 6:
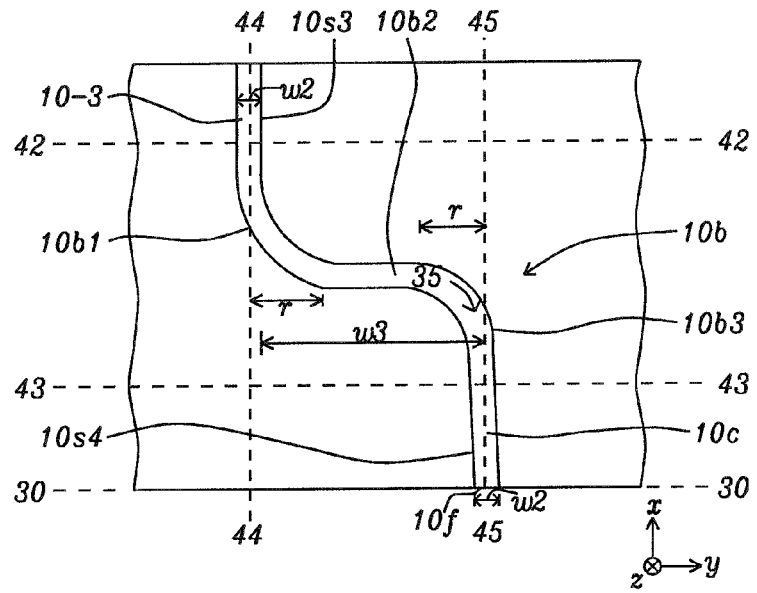
FIG. 6 is an enlarged view of a middle waveguide section including two bends in the waveguide structure in FIG. 5.

In the enlarged drawing of second curved section 10b in FIG. 6, both of the back end portion 10b1 and front end portion 10b3 have a curved shape wherein a radius of curvature r is at least 10 microns, and preferably 20 microns, in a cross-track direction in order to enable bending of light without loss of propagated light 35 in the primary waveguide. In other words, r relates to the cross-track distance between plane 44-44 and the nearest end of straight portion 10b2, and the cross-track distance between the opposite end of the straight portion and center plane 45-45. Straight portion 10b2 contacts both end portions 10b1, 10b3.

Figure 7:
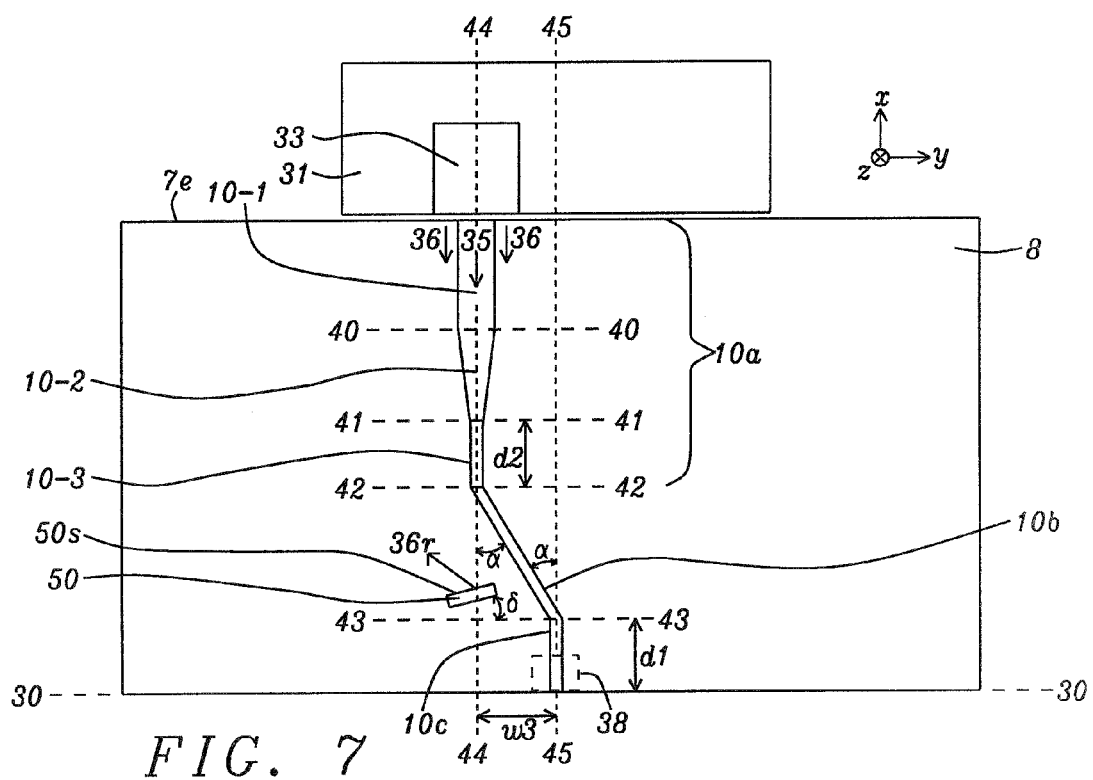
FIG. 7 is a top-down view of a TAMR light delivery waveguide circuit with a front section that is offset in a cross-track direction from a back section, and further includes a blocker according to a second embodiment of the present disclosure.

According to a second embodiment of the present disclosure depicted in FIG. 7, waveguide sections 10a, 10c are retained from the first embodiment. Moreover, the curved middle section 10b may have two curved end portions, and the straight portion 10b2 therebetween, which forms an angle α of 30 to 90 degrees with respect to plane 44-44 or to center plane 45-45. Moreover, a blocker 50 that serves as a reflective surface is added between the front side of portion 10-3 at plane 42-42 and the ABS 30-30 to prevent stray light 36 from the laser diode 33 from reaching metal structures such as the write pole in the vicinity of the ABS. The blocker is made of a metal or alloy such as Au, Ag, Cu, Cr, Ru, NiFe, FeCo, or the like, or may be a laminated stack of dielectric layers comprised of one or more of $Ta_2O_5$, alumina, or other dielectric materials. The blocker has sufficient cross-track width and down-track thickness to block all light from the laser diode that is not coupled into the waveguide light delivery circuit comprised of sections 10-1, 10-2, and 10-3. In a preferred embodiment, the blocker is formed between plane 42-42 and plane 43-43. As a result, stray light is reflected toward a back end 7e of the slider as depicted by light 36r.

The blocker may have a rectangular shape with a lengthwise dimension along surface 50s that is substantially in the cross-track direction and is intersected by plane 44-44. Preferably, the blocker is tilted such that surface 50s forms an angle δ that is greater than 0 degrees with respect to plane 43-43. The blocker thickness (height) in the x-axis direction is on the order of 200-400 nm when a metallic material is selected. When a laminated stack of dielectric material is employed for the blocker, the x-axis height is about 1 micron or greater at plane 44-44 in order to function effectively as a mirror to reflect stray light from the laser diode.

Because stray light 36 from laser diode 33 travels via loosely guided cladding modes that exist in the plane of the waveguide as well as in the regions proximate to the waveguide top and bottom surfaces, the blocker 50 may have a down-track thickness greater than the combined thickness of the primary waveguide and one or more secondary waveguides. A cross-track dimension of the blocker depends on placement. Generally, for a placement between plane 42-42 and 43-43 as depicted in FIG. 7, the cross-track width will be about 10 to 20 microns.

Figure 8:
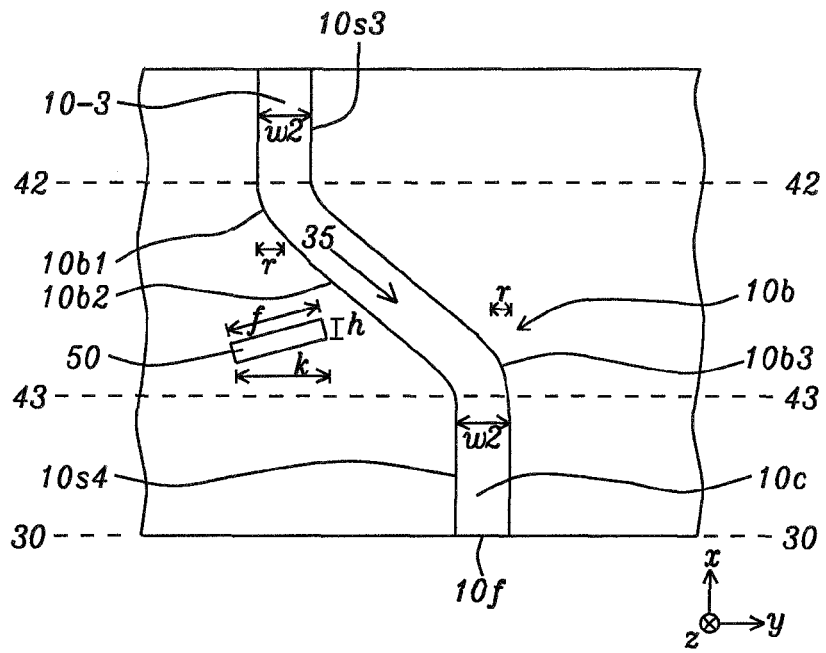
FIG. 8 is an enlarged view of a middle waveguide section including two bends in the waveguide structure in FIG. 7.

In FIG. 8, an enlarged view of curved section 10b in FIG. 7 is depicted wherein the first curved portion 10b1 adjoins a front end of the second section at plane 42-42, and the second curved portion 10b3 adjoins a back end of the third section at plane 43-43. Blocker 50 is shown with a lengthwise dimension f, a height h in an x-axis direction, and a cross-track dimension k. A straight center portion 10b2 is formed between the first and second curved portions. Each of the curved portions 10b1, 10b3 has a bending radius r as described previously.

In another series of embodiments, many of the features described in the TAMR light delivery waveguide circuits (paths) of FIGS. 5-8 are maintained. However, a key difference is that the laser diode is shifted to a mount position that is centered with respect to a back end of the slider. In other words, the center plane through the slider intersects the laser diode. Furthermore, the primary waveguide back section and front section are both aligned along the center plane. As a result of centering the laser diode on the back end of the slider, there is a symmetric distribution of mass in the cross-track direction. Moreover, no change is required in the current laser diode mounting process and tooling. Meanwhile, a middle section of the primary WG includes at least one 180° bend in order to propagate light around a blocker at the center plane. As indicated previously, the blocker is tilted to prevent stray light from returning to the laser diode and causing instability in light output.

Figure 9:
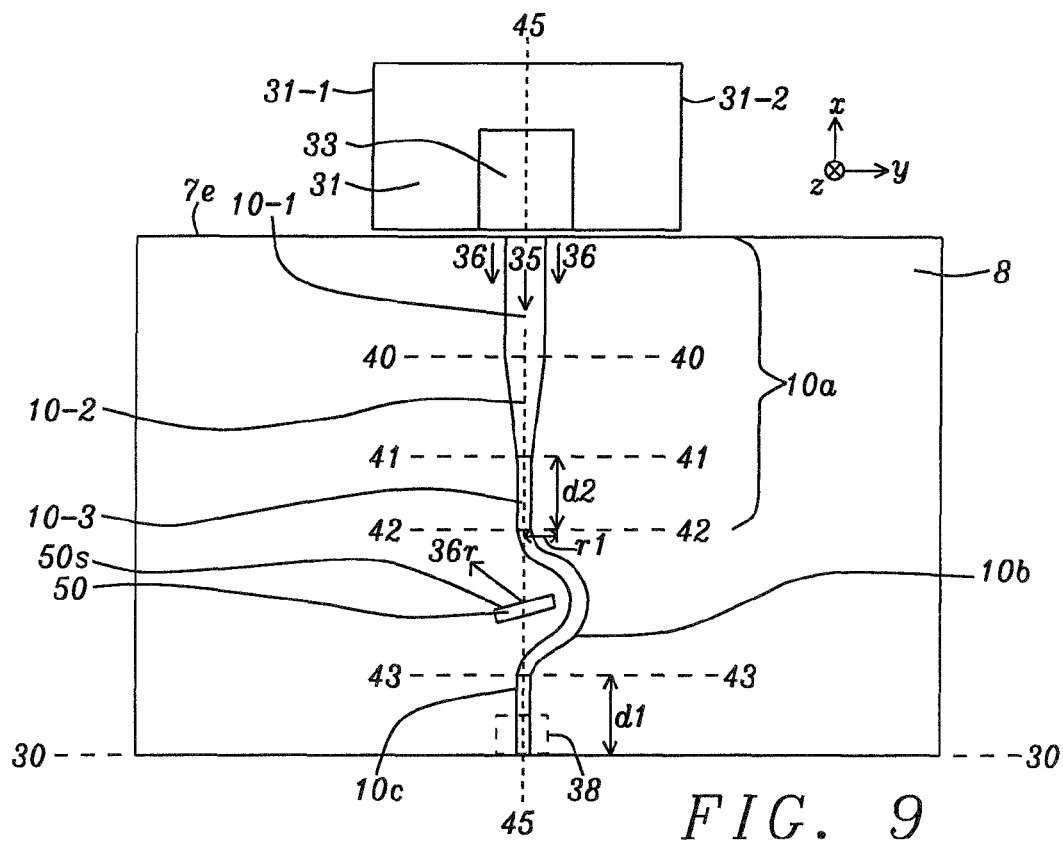
FIG. 9 is a top-down view of a TAMR light delivery circuit with a 180 bend around a metal blocker in a middle waveguide section according to a third embodiment of the present disclosure.

Referring to FIG. 9, another embodiment of the TAMR light delivery waveguide circuit of the present disclosure is illustrated. Laser diode 33 is mounted in a center position with respect to slider back end 7e, and is intersected by center plane 45-45. Sides 31s1, 31s2 of the sub-mount 31 are preferably equidistant from the center plane. Back section 10a of the waveguide structure including spot size converter 10-2 and optional portions 10-1, 10-3 is bisected in a lengthwise direction along the x-axis by the center plane. Moreover, the center plane bisects front waveguide section 10c, and the overlying PG 38. Blocker 50 is preferably formed between a front side of back section 10a at plane 42-42, and a back side of the front section at plane 43-43, and is intersected by the center plane. Curved middle section 10d of the waveguide forms a 180° bend around the blocker and extends from the front side of the back section at plane 42-42 to the back side of the front section at plane 43-43. A 180 degree bend is defined as a curved shape essentially equivalent to a half circle (or half oval) wherein the light path 35 begins and ends at the center plane.

In a preferred embodiment, the bending radius r1 is at least 10 microns and more preferably is 20 microns or greater to avoid sharp turns and maintain a confined propagated light path in the waveguide with minimal loss of transmission. Also, the bending radius must be sufficiently large to allow a tilted blocker to have a cross-track dimension of about 10-20 microns so that all stray light 36 is reflected as light 36r and prevented from returning to the laser diode or propagating to the proximity of the ABS. The blocker 50 has a height (x-axis dimension) of 200 nm to 1 micron at the center plane 45-45. Height d1 of the front section is about 10-15 microns as described in the previous embodiments.

Figure 10:
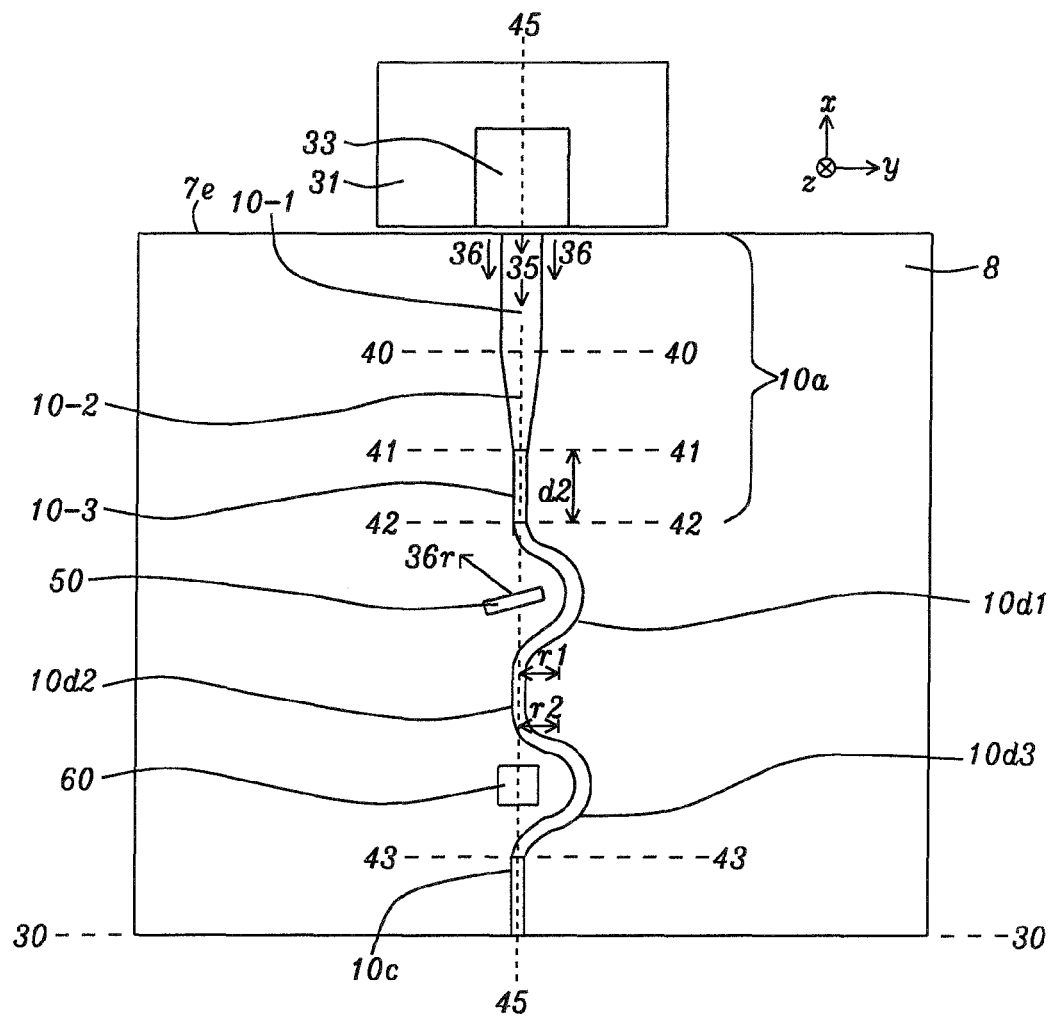
FIG. 10 is a top-down view of a TAMR light delivery circuit with a first 180° bend around a metal blocker and a second 180° bend around a writer back gap according to another embodiment of the present disclosure.

In another embodiment shown in FIG. 10, a second 180° bend is inserted in the middle waveguide section between plane 42-42 and plane 43-43. In this case, the first 180° bend illustrated in FIG. 9 is retained and depicted as curved shape 10d1, but instead of terminating the curved shape at the back side of the front section 10c at plane 43-43, a second 180° bend 10d3 is included to guide the propagated light around a writer back gap 60 that in some TAMR heads is located in the same plane as the primary waveguide. The writer back gap is an alloy such as CoFeNi that is typically employed as a magnetic connection between a return path and the main pole layer (not shown) to complete a leading loop in the magnetic scheme as appreciated by those skilled in the art. Although a square shape is depicted, the writer back gap may have other shapes including a rectangle or oval, for example. Similar to bending radius r1, the bending radius r2 of the second 180° bend should be at least 10 microns, and preferably at least 20 microns to maintain a confined light path in the waveguide with minimal loss of transmission. Furthermore, r2 may be unequal to r1.

In some embodiments, a straight waveguide portion 10d2 at the center plane 45-45 may be used to connect a front end of the first 180° bend 10d1 with a back end of the second 180° bend 10d3. The front end of the second 180° bend adjoins the back side of front section 10c at plane 43-43.

Figure 11:
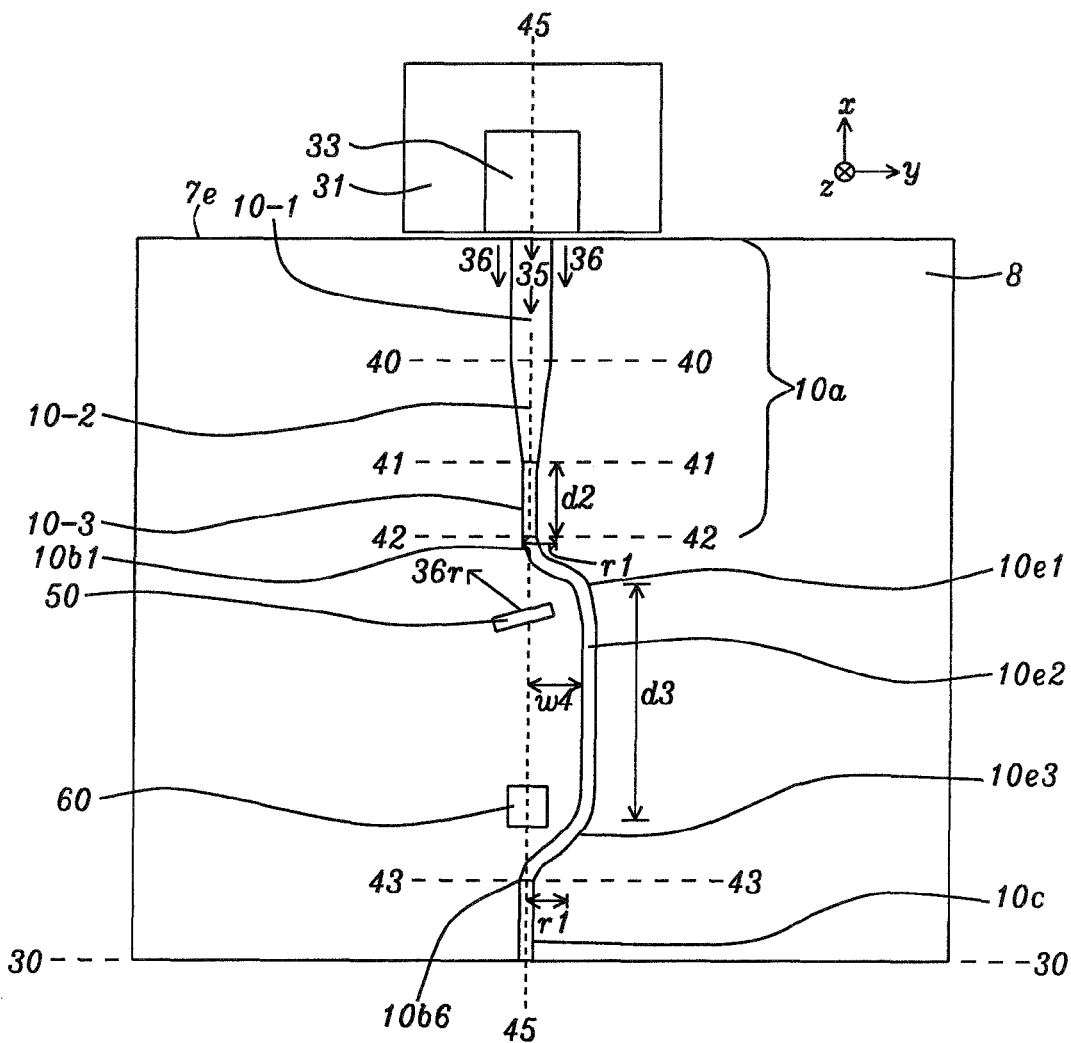
FIG. 11 is a top-down view of a TAMR light delivery circuit with a first bend around a metal blocker, and a second bend around a writer back gap according to an embodiment of the present disclosure.

In order to minimize the number of 180° bends and maintain a high transmission of propagated light in the waveguide, the TAMR light waveguide circuit shown in FIG. 10 may be modified to the design illustrated in FIG. 11. Thus, each of the two 180° bends in FIG. 10 is shortened to half of a 180° bend. As a result, the middle waveguide section between plane 42-42 and plane 43-43 has a first curved portion 10e1 with a back end 10b1 adjoining back section 10a at plane 42-42 and a front end 10b6 at plane 43-43. Straight portion 10e2 is offset a cross-track width w4 (equivalent to r1) from center plane 45-45 and adjoins an end of the first curved portion. The straight portion 10e2 extends a distance d3 on the order of tens of microns in a direction parallel to the center plane before adjoining a second curved portion 10e3. The second curved portion also has a bending radius r1 and returns the light path back to the center plane, and has a front end adjoining a back side of the front section at plane 43-43. In other words, a combination of two half 180° bends is used to complete a half circle (180° bend) around a blocker 50 and writer back gap 60 which are both intersected by the center plane.

The present disclosure is also a method of fabricating a TAMR light delivery waveguide circuit as described herein. According to one embodiment, the manufacturing sequence described in related patent application Ser. No. 14/880,385 may be followed to form a secondary waveguide on and within a dielectric layer (cladding layer) such as $Al_2O_3$ or silicon oxide. FIGS. 12-18 illustrate a sequence of process steps that may be employed to form a waveguide structure according to an embodiment of the present disclosure.

Figure 12:
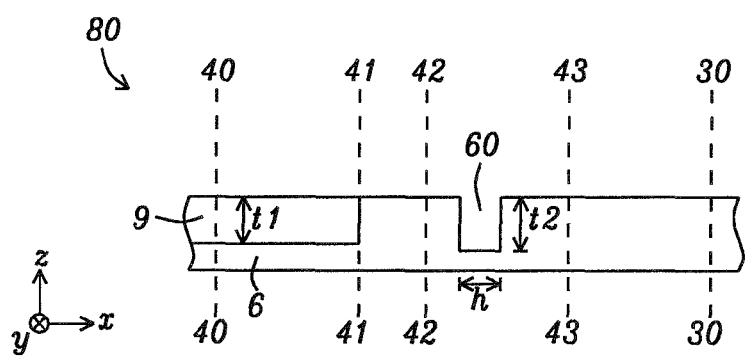
FIGS. 12-18 are down-track cross-sectional views depicting a process flow for forming a TAMR light waveguide circuit according to a method of the present disclosure.

As depicted in FIG. 12 with a down-track cross sectional view along center plane 45-45 shown in FIG. 9, a partially completed substructure 80 is provided wherein the secondary waveguide 9 is contacted on the sides and bottom surface by a cladding layer 6. Only the portion of the substructure between plane 40-40 and the ABS is shown in order to focus on key aspects of the present disclosure. The eventual location of the ABS is indicated by plane 30-30. Note that the secondary waveguide terminates at plane 41-41 so that all propagated light is coupled into the primary waveguide (shown in FIG. 18) before reaching the front end of the spot size converter at plane 41-41. In an embodiment wherein a blocker is included to prevent stray light from the laser diode from reaching the ABS, a bottom portion of the blocker is formed at this point by using a well known process sequence of etching an opening 60 having a shape of the blocker in the cladding layer, and depositing the blocker material in the opening. The opening has a height h in the x-axis direction.

Figure 13:
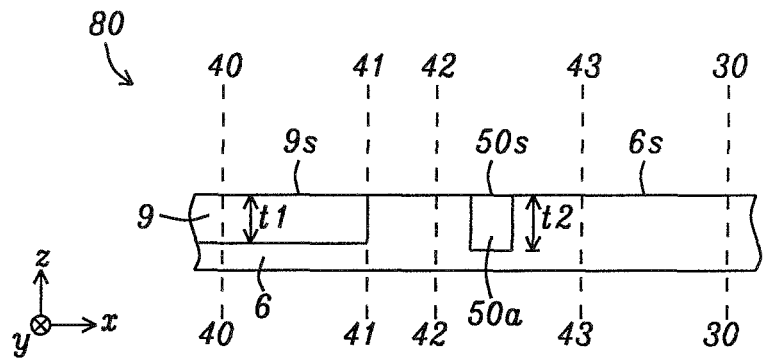
Figure 18:
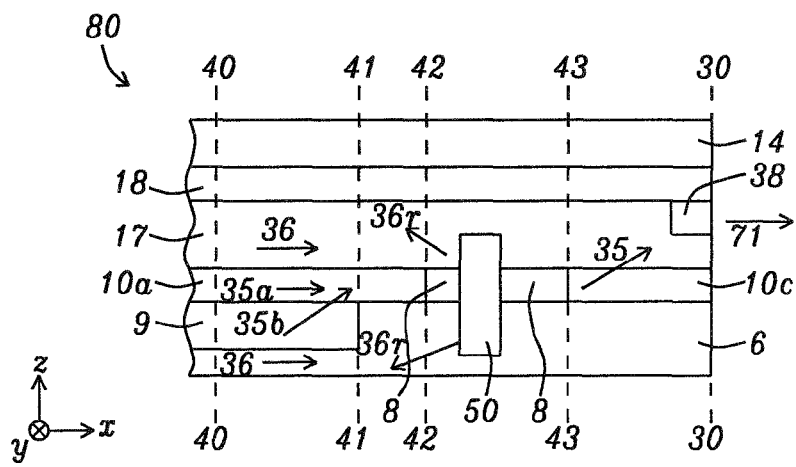

FIG. 13 depicts the substructure 80 after a bottom portion 50a of the blocker is deposited in the opening in FIG. 12, and a chemical mechanical polish (CMP) step is performed to form a planar surface of a substructure in the partially completed TAMR head wherein top surfaces 9s, 6s, 50s, respectively, of the secondary WG 9, cladding layer 6, and blocker bottom portion are coplanar. The bottom portion 50a has a thickness t2 that is greater than a thickness t1 of the secondary waveguide 9 in order to prevent loosely guided cladding modes of stray light 36 adjacent to a bottom surface of the secondary waveguide from reaching the ABS 30-30 as illustrated in FIG. 18.

Figure 14:
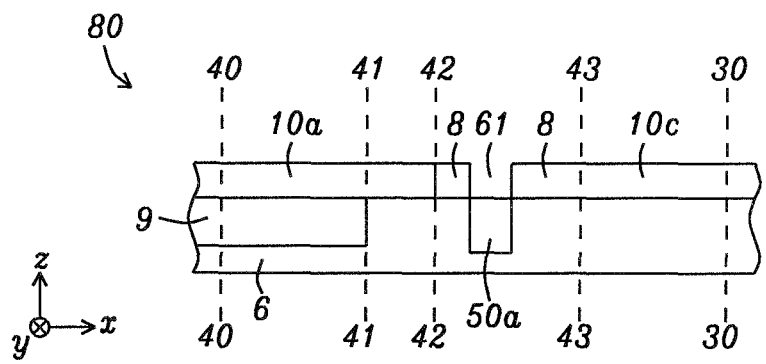

In FIG. 14, the substructure 80 is shown after a second cladding layer 8 is deposited on the first cladding layer 6, and the primary waveguide is formed by a conventional process in the second cladding layer such that a back section 10a thereof contacts secondary waveguide 9 from plane 41-41 to a back end of the slider (not shown). Front section 10c is formed on cladding layer 6 between plane 43-43 and the eventual ABS at plane 30-30. The curved middle section 10d of the primary waveguide shown in FIG. 9 is behind the plane of the paper in FIG. 14 and subsequent drawings. Thus the second cladding layer 8 separates the primary WG front and back sections at plane 45-45. An opening 61 for a middle portion of the blocker is formed above the bottom portion 50a and has the same height in the x-axis direction as opening 60 in FIG. 12.

Figure 15:
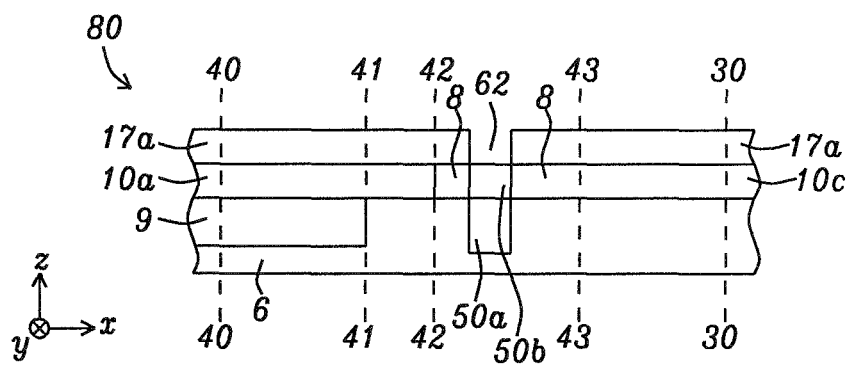

Referring to FIG. 15, opening 61 is filled with the middle portion 50b of the blocker and a second CMP process may be performed to form a planar top surface on the substructure. Thereafter, a third cladding layer 17a is deposited on the primary waveguide and second cladding layer 8. Opening 62 is formed in the third cladding layer above middle portion 50b and has a height in the x-axis direction equivalent to that of opening 60 in FIG. 12.

Figure 16:
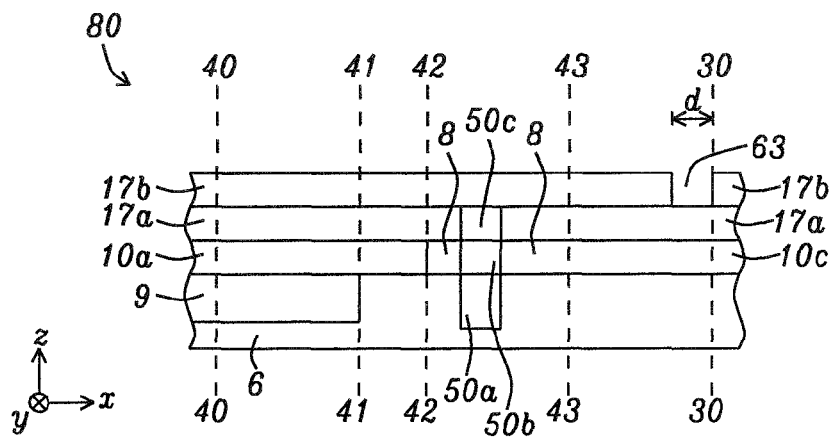

In FIG. 16, an upper portion 50c of the blocker is deposited to fill opening 62 and a third CMP process may be performed to form a planar top surface on the substructure 80. Then, a gap layer 17b is deposited on the third cladding layer 17a. An opening 63 with the shape of the near field transducer (PG) is formed in the gap layer and extends from plane 30-30 to a distance d such that a back side of the opening is a substantial distance from plane 43-43. Note that opening 63 may extend to the right of plane 30-30 but that portion of the PG will be removed in a subsequent lapping procedure when the ABS is established.

Figure 17:
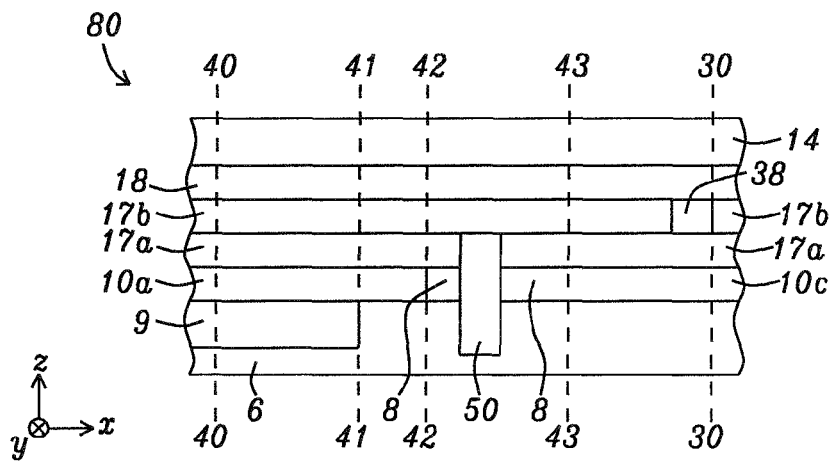

Referring to FIG. 17, the PG 38 is deposited to fill opening 63 by a conventional method. A CMP process may be performed to form a planar top surface on substructure 80. Next, a second gap layer 18 and write pole 14 are sequentially formed on gap layer 17b by a well known method. Note that the blocker is now shown as a single layer 50 and consists of sub-layers 50a-50c described previously.

Thereafter, a conventional sequence of steps is followed to form the remainder of the TAMR head above the write pole. FIG. 18 illustrates a portion of the TAMR write head including the light delivery waveguide circuit after a lapping process is performed to form the ABS 30-30. A single gap layer 17 now represents the stack of layers 17a, 17b depicted in FIG. 17. The blocker 50 has a sufficient down-track thickness to prevent stray light 36 emanating from the laser diode (not shown) that is propagating above the plane of primary waveguide section 10a and below the plane of the secondary waveguide 9 from reaching the ABS. Instead, stray light is reflected 36r toward a back end of the slider, but away from the laser diode, after impinging on the blocker. Propagated light 35b in the secondary WG is coupled into the primary WG before reaching plane 41-41 where the spot size converter has a front side facing the ABS. Propagated light 35a in the primary WG (along with coupled light from the secondary WG) continues to plane 42-42 and is directed around the blocker by a 180° bend (not shown) until reaching plane 43-43 and returning to the center plane in front section 10c. Light 35 is evanescently coupled from front section to the PG 38 and then plasmon energy 71 from the PG is evanescently coupled to a bit on a magnetic medium (not shown) to facilitate a write process as appreciated by those skilled in the art.

As explained earlier in related patent application Ser. No. 14/880,385, TM mode transmission coupling efficiency from the secondary WG to the primary WG in a back section of the waveguide structure may be optimized by fabricating a tapered secondary waveguide design having a ridge with a terminal width of 50-170 nm as disclosed therein. Moreover, as we have described herein, the light path may be curved in a middle portion of the primary WG to accommodate a light blocker from preventing stray light from causing undesirable thermo-mechanical expansion of metal parts proximate to the ABS. Furthermore, the blocker is tilted with respect to the cross-track direction to avoid reflected light from returning to the laser diode. The front section of the primary WG at the ABS may be offset in a cross-track direction from the back section, or aligned along the same center plane as the back section for better mechanical stability of the head-gimbal assembly (HGA) during device operation.

While this disclosure has been particularly shown and described with reference to, the preferred embodiment thereof, it will be understood by those skilled in the art that various changes in form and details may be made without departing from the spirit and scope of this disclosure.

We claim:

1. A thermally assisted magnetic recording (TAMR) head with a light delivery waveguide circuit, comprising:
    (a) a laser diode that is end-fired coupled to a back end of a slider, the laser diode directs light into a waveguide structure that serves as a light delivery circuit for propagating light to an air bearing surface (ABS);
    (b) the waveguide structure comprising a primary waveguide with a back end that captures light from the laser diode, and a front end at the ABS, the primary waveguide comprises:
        (1) a spot size converter with a fixed down-track thickness and two tapered sides that confine light in a cross-track direction, the two tapered sides extend from a back side having cross-track width w1 at a first plane that faces the laser diode and is parallel to the ABS to a front side at a second plane formed parallel to the ABS and having a cross-track width w2 where w2<w1, the spot size converter is bisected in a lengthwise dimension by a third plane aligned orthogonal to the ABS;
        (2) a curved second section that bends propagated light from the spot size converter, the propagated light enters through a first end that is intersected by the third plane and faces the spot size converter, and exits through a second end that adjoins a back side of a third section of the primary waveguide, the second curved section includes a straight portion between the first and second ends; and (3) the third section having width w2 between sides aligned orthogonal to the ABS, and extending from the second end of the second curved section to the ABS, propagated light in the third section is evanescently coupled to a near field transducer that is configured to generate a heating spot on a magnetic medium to facilitate a write process, the third section is bisected by a center plane formed orthogonal to the ABS such that the third plane is offset by a first cross-track distance from the center plane; and (c) the near field transducer that is between the primary waveguide and a write pole at the ABS, and is intersected by the center plane.

2. The TAMR head of claim 1 wherein the primary waveguide further comprises a back section having a cross-track width w1 and with a back side facing the laser diode, and a front side adjoining the spot size converter at the first plane.

3. The TAMR head of claim 1 wherein the primary waveguide further comprises a fourth section with cross-track width w2, and having a side on each side of the third plane, the fourth section contacts the spot size converter at the second plane, and adjoins the first end of the second curved section at a second distance from the second plane.

4. The TAMR head of claim 1 wherein the straight portion in the curved second section is aligned at an angle from 30 degrees to 90 degrees with respect to the third plane.

5. The TAMR head of claim 1 wherein w2 is about 400 nm to 800 nm.

6. The TAMR head of claim 1 wherein the offset between the third plane and the center plane is about 20 nm to 200 nm.

7. The TAMR head of claim 1 wherein the first end and second end of the curved second section have a curved shape with a radius of curvature of at least 10 microns.

8. The TAMR head of claim 1 wherein the third section extends a distance of about 10 to 15 microns from the ABS.

9. The TAMR head of claim 1 further comprising a blocker made of a metal or a laminated stack of dielectric material that is formed between the second plane and the ABS, the blocker is intersected by the third plane.

10. The TAMR head of claim 9 wherein the blocker has a down-track thickness greater than a thickness of the waveguide structure, and a cross-track width in the range of 10 to 20 microns to reflect stray light from the laser diode.

11. The TAMR head of claim 9 wherein the blocker has a dimension (height) orthogonal to the ABS of about 200 nm to 1 micron at the third plane.

12. A thermally assisted magnetic recording (TAMR) head with a light delivery waveguide circuit, comprising:

(a) a laser diode that is end-fired coupled to a back end of a slider, the laser diode directs light into a waveguide structure that serves as a light delivery circuit for propagating light to an air bearing surface (ABS);

(b) the waveguide structure comprising a primary waveguide with a back end that captures light from the laser diode, and a front end at the ABS, the primary waveguide comprises:

(1) a spot size converter with a fixed down-track thickness and two tapered sides that confine light in a cross-track direction, the two tapered sides extend from a back side having cross-track width w1 at a first plane that faces the laser diode and is parallel to the ABS to a front side at a second plane formed parallel to the ABS and having a cross-track width w2 where w2<w1, the spot size converter is bisected in a lengthwise dimension by a center plane aligned orthogonal to the ABS and that intersects the laser diode;

(2) a curved second section comprised of a 180° bend that bends propagated light from the spot size converter around a blocker which reflects stray light from the laser diode, the propagated light enters through a first end intersected by the center plane and that faces the spot size converter, and exits through a second end that is intersected by the center plane; and (3) the third section having width w2 between sides aligned orthogonal to the ABS, and extending from a front side at the ABS to a back side that adjoins a front end of the second curved section at a third plane formed parallel to the ABS, propagated light in the third section is evanescently coupled to a near field transducer that is configured to convert propagated light to plasmon energy, and to evanescently couple said plasmon energy to a magnetic medium to facilitate a write process, the third section is bisected by the center plane;

(c) the near field transducer that is between the primary waveguide and a write pole at the ABS, and is intersected by the center plane; and (d) the blacker that is intersected by the center plane and formed between the first end of the curved second section and the third plane.

13. The TAMR head of claim 12 wherein the primary waveguide further comprises a back section having cross-track width w1 and with a back side facing the laser diode, and a front side adjoining the spot size converter at the first plane.

14. The TAMR head of claim 12 wherein the primary waveguide further comprises a fourth section with cross-track width w2, and having a side on each side of the center plane, the fourth section contacts the spot size converter at the second plane, and adjoins the first end of the second curved section.

15. The TAMR head of claim 12 wherein the curved second section further includes a middle straight portion at the center plane, and a second 180° bend around a writer back gap structure, the second 180° bend has a back end adjoining the middle straight portion and a front end adjoining the front section at the third plane.

16. The TAMR head of claim 12 wherein w2 is about 400 nm to 800 nm.

17. The TAMR head of claim 15 wherein each of the first and second 180° bends has a radius of curvature of at least 10 microns.

18. The TAMR head of claim 12 wherein the third section extends a distance of about 10 to 15 microns from the ABS.

19. The TAMR head of claim 12 wherein the blocker has a down-track thickness greater than a thickness of the waveguide structure, and a cross-track width in the range of 10 to 20 microns.

20. The TAMR head of claim 12 wherein the blocker has a height of about 200 nm to 1 micron at the center plane.

21. A method of fabricating a light delivery waveguide circuit in a thermally assisted magnetic recording (TAMR) head wherein light is propagated from a laser diode through a spot size converter to a front section of a primary waveguide, and is then evanescently coupled to a near field transducer that is configured to generate a heating spot on a magnetic medium to facilitate a write process, comprising:

(a) providing a substructure wherein a secondary waveguide is formed within a first cladding layer, and forming a bottom portion of a blocker in an upper portion of the first cladding layer between the secondary waveguide and an eventual air bearing surface (ABS) plane, the blocker reflects stray light from the laser diode;

(b) forming a second cladding layer on the first cladding layer, and a primary waveguide (WG) in the second cladding layer, the primary WG has a fixed down-track thickness and comprises:

(1) a spot size converter that adjoins a top surface of the secondary WG and has a front end at a first plane formed parallel to the ABS plane, and has two tapered sides to confine propagated light in a cross-track direction;

(2) a middle curved section that comprises a 180° bend to direct propagated light around the blocker comprised of the bottom portion; and (3) a front section that extends from a front side at the ABS plane to a back side at a second plane that is parallel to the ABS plane, the spot size converter, blocker, and front section are intersected by a center plane aligned orthogonal to the ABS plane;

(c) forming the middle portion of the blocker in the second cladding layer between the first plane and the second plane;

(d) forming a third cladding layer on the second cladding layer, and an upper portion of the blocker in the third cladding layer, the bottom, middle, and upper portions of the blocker have a first height at the center plane, and form a stack having a first down-track thickness and a cross-track width; and (e) forming a gap layer on the third cladding layer and a near field transducer therein at the ABS plane, the near field transducer is intersected by the center plane and extends a first distance towards a back end of the TAMR head.

22. The method of claim 21 wherein the first down-track thickness of the blocker is greater than a combined thickness of the primary waveguide and secondary waveguide.

23. The method of claim 21 wherein the first height is from about 200 nm to 1 micron.

24. The method of claim 21 wherein the blocker is a metal or a laminated stack of dielectric materials.

25. The method of claim 21 wherein the middle curved section further comprises a second 180° bend around a writer back gap between the first 180° bend and the second plane.

26. The method of claim 21 wherein the cross-track width of the blocker is about 10 to 20 microns.

27. The method of claim 21 wherein the blocker is tilted with respect to the second plane.

28. The method of claim 21 further comprised of forming a write pole above the near field transducer at the ABS plane.

* * * * *